(12) United States Patent
Jo et al.

(10) Patent No.: US 9,417,741 B2
(45) Date of Patent: Aug. 16, 2016

(54) CAPACITANCE SENSING APPARATUS AND TOUCHSCREEN APPARATUS

(71) Applicant: SAMSUNG ELECTRO-MECHANICS CO., LTD., Suwon (KR)

(72) Inventors: Byeong Hak Jo, Suwon (KR); Tah Joon Park, Suwon (KR); Yong Il Kwon, Suwon (KR); Hyun Suk Lee, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 252 days.

(21) Appl. No.: 13/887,841

(22) Filed: May 6, 2013

(65) Prior Publication Data

US 2014/0225858 A1 Aug. 14, 2014

(30) Foreign Application Priority Data

Feb. 13, 2013 (KR) ........................ 10-2013-0015353

(51) Int. Cl.
*G06F 3/044* (2006.01)
*G06F 3/041* (2006.01)

(52) U.S. Cl.
CPC .............. *G06F 3/044* (2013.01); *G06F 3/0418* (2013.01)

(58) Field of Classification Search
CPC ........ G06F 3/044; G06F 3/045; G06F 3/0412
USPC ........................... 345/156, 168, 173–174, 179
See application file for complete search history.

(56) References Cited

U.S. PATENT DOCUMENTS

| 2007/0069819 A1* | 3/2007 | Hayashi ................ G05F 1/56 330/297 |
| 2007/0262969 A1 | 11/2007 | Pak |
| 2011/0109585 A1 | 5/2011 | Kwon et al. |
| 2011/0199105 A1* | 8/2011 | Otagaki et al. ............. 324/679 |
| 2013/0257785 A1* | 10/2013 | Brown et al. ............... 345/174 |
| 2013/0321326 A1* | 12/2013 | Kwon et al. ................ 345/174 |
| 2014/0009216 A1* | 1/2014 | Jo et al. ..................... 327/517 |
| 2014/0035862 A1* | 2/2014 | Jeong et al. ................ 345/174 |

FOREIGN PATENT DOCUMENTS

| KR | 10-2007-0109360 | 11/2007 |
| KR | 10-2011-0052423 | 5/2011 |

\* cited by examiner

*Primary Examiner* — Kumar Patel
*Assistant Examiner* — Mansour M Said
(74) *Attorney, Agent, or Firm* — NSIP Law

(57) ABSTRACT

A capacitance sensing apparatus includes: a driving circuit unit applying a driving signal of a first period to a node capacitor; a first integrating circuit unit integrating voltage charged in the node capacitor to generate output voltage of which a voltage level is changed twice during a second period; a buffer capacitor charged or discharged by the output voltage of the first integrating circuit unit; a second integrating circuit unit integrating voltage charged in the buffer capacitor to generate output voltage of which a voltage level is changed twice during the first period; and an amplifying unit differentially amplifying non-inverted output voltage and inverted output voltage of the second integrating circuit unit, wherein the amplifying unit amplifies voltage corresponding to a difference between the non-inverted output voltage and the inverted output voltage during a reset section of the second integrating circuit unit to generate offset information.

15 Claims, 5 Drawing Sheets

CAPACITANCE SENSING APPARATUS AND TOUCHSCREEN APPARATUS

CROSS-REFERENCE TO RELATED APPLICATIONS

This application claims the priority of Korean Patent Application No. 10-2013-0015353 filed on Feb. 13, 2013, in the Korean Intellectual Property Office, the disclosure of which is incorporated herein by reference.

BACKGROUND OF THE INVENTION

1. Field of the Invention

The present invention relates to a capacitance sensing apparatus and a touchscreen apparatus.

2. Description of the Related Art

A touch sensing apparatus such as a touchscreen, a touch pad, or the like, an input apparatus attached to a display apparatus to provide an intuitive data input method to a user, has recently been widely used in various electronic devices such as cellular phones, personal digital assistants (PDAs), navigation devices, and the like. Particularly, as demand for smartphones has recently increased, the use of touchscreens as touch sensing apparatuses capable of providing various data input methods in a limited area has correspondingly increased.

Touchscreens used in portable devices may be mainly divided into resistive type touchscreens and capacitive type touchscreens, according to a method of sensing a touch input utilized thereby. Here, capacitive type touchscreens have advantages in that they have relatively long lifespans and various data input methods and gestures may easily implemented therewith, such that the use thereof has correspondingly increased. Particularly, a multi-touch interface may be more easily implemented in capacitive type touchscreens as compared to resistive type touchscreens, such that capacitive type touchscreens are widely used in devices such as smartphones, and the like.

Capacitive type touchscreens include a plurality of electrodes having a predetermined pattern and defining a plurality of nodes at which a change in capacitance is generated by a touch input. In the plurality of nodes distributed on a two-dimensional plane, a change in self capacitance or a change in mutual capacitance is generated by the touch input. Coordinates of the touch input may be calculated by applying a weighted average method, or the like, to the change in capacitance generated in the plurality of nodes. In order to accurately calculate the coordinate of the touch input, technology capable of accurately sensing the change in capacitance generated by the touch input is required. However, in the case in which electrical noise is generated in a wireless communications module, a display apparatus, or the like, it may hinder the change in capacitance from being accurately sensed. In addition, an offset value that becomes a reference in determining the touch input should be continuously accurately set, according to an operational environment, and a touch input intended by the user may be erroneously recognized in the case in which the offset value is erroneously set due to foreign objects present in a panel unit, an unintended touch operation of the user, and the like.

The following Related Art Document (Patent Document 1), which relates to a touchscreen apparatus and a noise removing method thereof, discloses a feature of removing noise using an offset calculated by averaging low data, but fails to disclose a feature of integrating a change in capacitance generated in a touch panel twice in positive (+) and negative (−) directions during a single period of a driving signal to remove common noise and amplifying the integrated voltage to generate offset information.

RELATED ART DOCUMENT (Patent Document 1) Korean Patent Laid-Open Publication No. 10-2007-0109360

SUMMARY OF THE INVENTION

An aspect of the present invention provides a capacitance sensing apparatus and a touchscreen apparatus for integrating a change in capacitance generated in a touch panel twice in positive (+) and negative (−) directions during a single period of a driving signal in order to remove common noise and differentially amplifying integrated non-inverted and inverted output voltages in order to accurately set an offset value.

According to an aspect of the present invention, there is provided a capacitance sensing apparatus including: a driving circuit unit applying a driving signal of a predetermined first period to a node capacitor; a first integrating circuit unit integrating a voltage charged in the node capacitor to generate an output voltage of which a voltage level is changed twice during a second period, different from the first period; a buffer capacitor charged or discharged by the output voltage of the first integrating circuit unit; a second integrating circuit unit integrating a voltage charged in the buffer capacitor to generate an output voltage of which a voltage level is changed twice during the first period; and an amplifying unit differentially amplifying a non-inverted output voltage and an inverted output voltage of the second integrating circuit unit, wherein the amplifying unit amplifies a voltage corresponding to a difference between the non-inverted output voltage and the inverted output voltage during a reset section of the second integrating circuit unit to generate offset information.

The output voltage of the first integrating circuit unit may be regularly and repeatedly decreased, maintained, increased, maintained, increased, maintained, decreased, and maintained.

The non-inverted output voltage of the second integrating circuit unit may be increased at a point in time at which the output voltage of the first integrating circuit unit is decreased.

The driving circuit unit may include: a first switch disposed between a first node of the node capacitor and a driving voltage terminal; and a second switch disposed between the first node of the node capacitor and a common voltage terminal, wherein the first and second switches are switched by first and second clocks having the first period, respectively, and the first and second clocks have a phase difference of 180 degrees therebetween.

The first integrating circuit unit may include: a third switch having one end connected to a second node of the node capacitor; a fourth switch disposed between the second node of the node capacitor and the common voltage terminal; a first operational amplifier having an inverting terminal connected to the other end of the third switch and a non-inverting terminal connected to the common voltage terminal; a fifth switch disposed between the inverting terminal of the first operational amplifier and an output terminal of the first operational amplifier; and a first feedback capacitor connected to the fifth switch in parallel, wherein the third switch is switched by a third clock having the second period, the fourth and fifth switches are switched by a fourth clock having the second period, and the third and fourth clocks have a phase difference of 180 degrees therebetween.

The second integrating circuit unit may include: a sixth switch having one end connected to the buffer capacitor; a seventh switch disposed between the buffer capacitor and the common voltage terminal; a second operational amplifier having an inverting terminal connected to the other end of the sixth switch and a non-inverting terminal connected to the common voltage terminal; an eighth switch disposed between the inverting terminal of the second operational amplifier and a non-inverting output terminal of the second operational amplifier; and a second feedback capacitor connected to the eighth switch in parallel, wherein the sixth and seventh switches are switched by fifth and sixth clocks having the first period, respectively, and the fifth and sixth clocks have a phase difference of 180 degrees therebetween.

The first period may be twice as large as the second period.

The first and fifth clocks may have a phase difference of 90 degrees therebetween.

The amplifying unit may include at least one amplifying circuit differentially amplifying the non-inverted output voltage and the inverted output voltage of the second integrating circuit unit.

According to another aspect of the present invention, there is provided a touchscreen apparatus including: a panel unit including a plurality of driving electrodes and a plurality of sensing electrodes; a driving circuit unit applying a driving signal having a predetermined first period to the plurality of respective driving electrodes; a sensing circuit unit sensing changes in capacitance generated in intersection points between the plurality of driving electrodes and the plurality of sensing electrodes to generate first and second integrated voltages of which levels are changed at least twice during the first period and differentially amplifying the first and second integrated voltages to generate an analog signal; a signal converting unit converting the analog signal into a digital signal; and a calculating unit determining a touch input based on the digital signal, wherein the calculating unit generates offset data according to the digital signal generated during a reset section of the sensing circuit unit.

The first and second integrated voltages may have the same magnitude and different polarities.

The calculating unit may subtract the offset data from the digital signal generated during an operational section of the sensing circuit unit to generate valid data.

The sensing circuit unit may sense the changes in capacitance to generate a buffer voltage regularly and repeatedly decreased, maintained, increased, maintained, increased, maintained, decreased, and maintained during a predetermined second period, and integrate the buffer voltage to generate the first and second integrated voltages.

The first period may be twice as large as the second period.

The calculating unit may determine at least one of coordinates, the number, and gestures of touch inputs based on the valid data.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
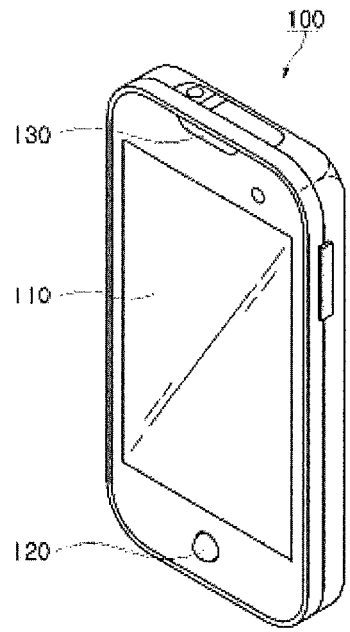
FIG. 1 is a perspective view showing an external appearance of an electronic device including a capacitance sensing apparatus according to an embodiment of the present invention.

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Throughout the drawings, the same or like reference numerals will be used to designate the same or like elements.

FIG. 1 is a perspective view showing an external appearance of an electronic device including a capacitance sensing apparatus according to an embodiment of the invention. Referring to FIG. 1, an electronic device 100 according to the present embodiment may include a display apparatus 110 for outputting an image, an input unit 120, an audio unit 130 for outputting an audio signal, and a touchscreen apparatus integrated with the display apparatus 110.

As shown in FIG. 1, in the case of a mobile device, the touchscreen apparatus may be generally provided in a state in which it is integrated with the display apparatus and requires a level of light transmissivity high enough to transmit an image displayed by the display apparatus. Therefore, the touchscreen apparatus may be implemented by forming sensing electrodes on a base substrate formed of a transparent film material such as polyethylene terephtalate (PET), polycarbonate (PC), polyethersulfone (PES), polyimide (PI), or the like, using a transparent and electrically conductive material such as indium tin oxide (ITO), indium zinc oxide (IZO), zinc oxide (ZnO), carbon nanotubes (CNT), or graphene. The display apparatus may include a wiring pattern disposed in a bezel region thereof, wherein the wiring pattern is connected to the sensing electrodes formed of the transparent and conductive material. Since the wiring pattern is visually shielded by the bezel region, it may be formed of a metal such as silver (Ag), copper (Cu), or the like.

Since it is assumed that the touchscreen apparatus according to the embodiment of the invention is operated in a capacitive scheme, the touchscreen apparatus may include a plurality of electrodes having a predetermined pattern. In addition, the touchscreen apparatus according to the embodiment of the invention may include a capacitance sensing apparatus for detecting a change in capacitance generated in the plurality of electrodes. Hereinafter, a capacitance sensing apparatus and an operating method thereof according to the embodiment of the invention will be described with reference to FIGS. 2 through 5.

Figure 2:
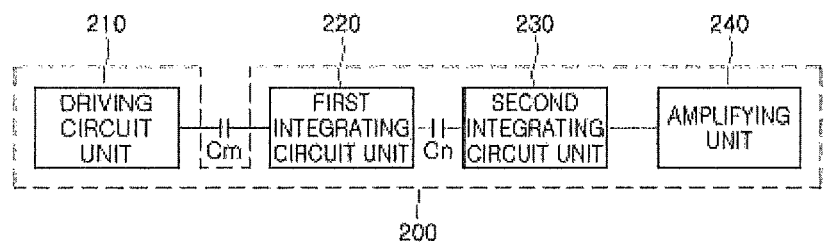
FIG. 2 is a block diagram showing a capacitance sensing apparatus according to an embodiment of the present invention.

FIG. 2 is a block diagram showing a capacitance sensing apparatus according to an embodiment of the invention. Referring to FIG. 2, a capacitance sensing apparatus 200 according to the present embodiment may include a driving circuit unit 210, a first integrating circuit unit 220, a second integrating circuit unit 230, and an amplifying unit 240. A capacitor Cm in which a change in capacitance to be measured is generated may be connected between the driving circuit unit 210 and the first integrating circuit unit 220.

In FIG. 2, the capacitor Cm may correspond to a capacitor in which capacitance to be measured by the capacitance sensing apparatus 200 according to the present embodiment is charged. As an example, the capacitor Cm may correspond to mutual capacitance generated between a plurality of electrodes included in a capacitive type touchscreen. Hereinafter, for convenience of explanation, it is assumed that the capacitance sensing apparatus 200 according to the present embodiment senses a change in capacitance generated in the capacitive type touchscreen. In this case, it may be assumed that the capacitor Cm is a node capacitor in or from which charges are charged or discharged by changes in mutual capacitance generated in intersection points between the plurality of electrodes.

The driving circuit unit 210 may generate a predetermined driving signal for charging the charges in the capacitor Cm and supply the generated driving signal to the capacitor Cm. The driving signal may be a square wave signal having a pulse form and may have a predetermined frequency. The first integrating circuit unit 220 may include one or more capacitors, charged or discharged by receiving the charges charged in the capacitor Cm. The first integrating circuit unit 220 may generate an output voltage from charges charged in or discharged from the capacitor. Here, the output voltage of the first integrating circuit unit 220 may be determined according to capacitance of the capacitor Cm, capacitance of the capacitor included in the first integrating circuit unit 220, a voltage level of the driving signal, and the like.

The output voltage of the first integrating circuit unit 220 may be transferred to a buffer capacitor Cn, such that the buffer capacitor is charged, and charges charged in the buffer capacitor may be supplied to the second integrating circuit unit 230.

The second integrating circuit unit 230 may include one or more capacitors, charged or discharged by receiving the charges charged in the buffer capacitor Cn. The second integrating circuit unit 220 may inverting-integrate or non-inverting-integrate the charges charged in or discharged from the capacitor to generate a non-inverted output voltage or an inverted output voltage.

The amplifying unit 240 may differentially amplify the non-inverted output voltage and the inverted output voltage output from the second integrating circuit unit 230.

Figure 3:
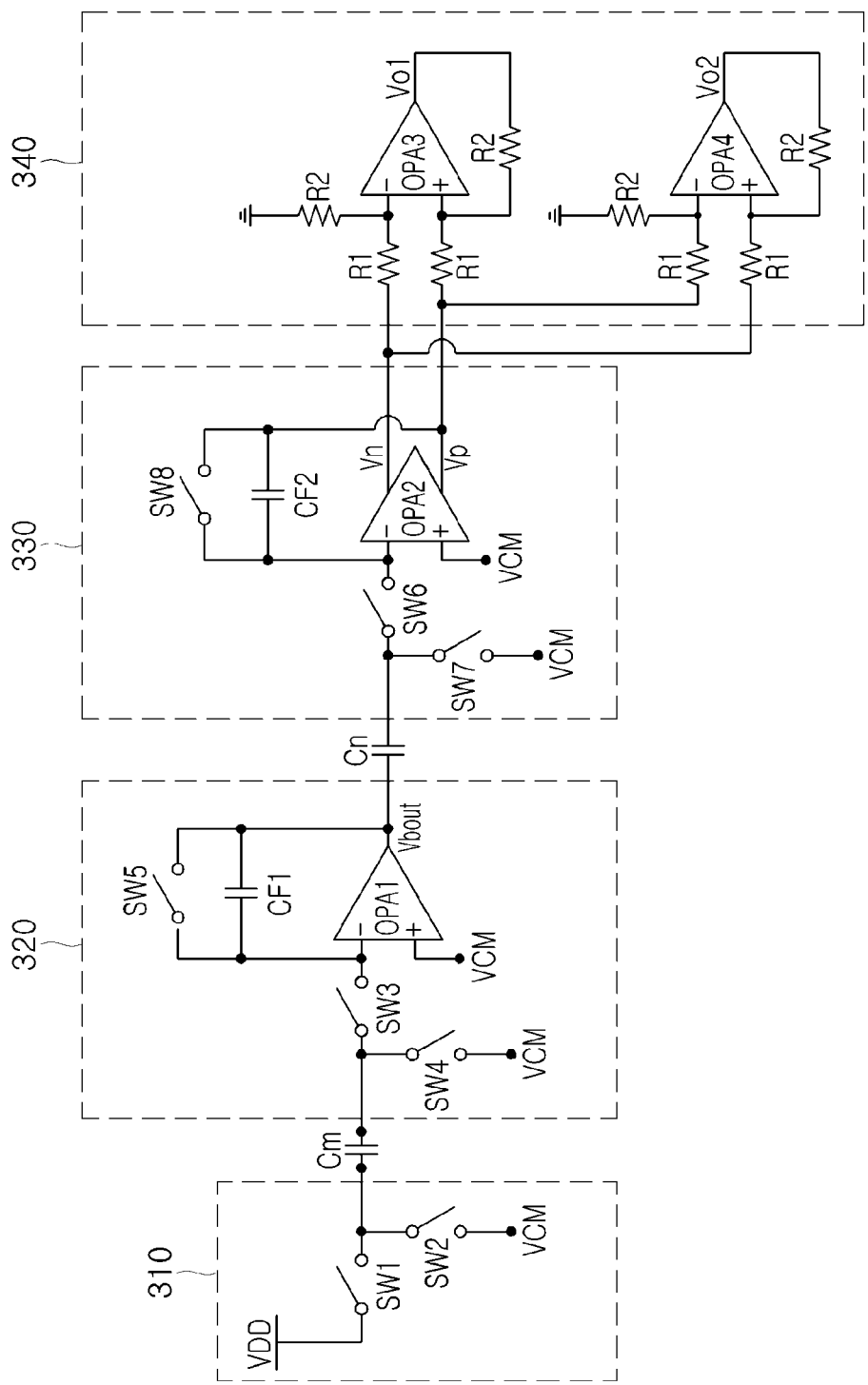
FIG. 3 is a circuit diagram showing a capacitance sensing apparatus according to an embodiment of the present invention.

FIG. 3 is a circuit diagram showing a capacitance sensing apparatus according to an embodiment of the invention. Referring to FIG. 3, a capacitance sensing apparatus according to the present embodiment may include a driving circuit unit 310, a first integrating circuit unit 320, a second integrating circuit unit 330, and an amplifying unit 340. Similar to FIG. 2, a capacitor Cm may correspond to a node capacitor of a capacitive type touchscreen.

The driving circuit unit 310 may include switches SW1 and SW2. Here, the switch SW1 may be disposed between a first node of the node capacitor Cm and a driving voltage VDD terminal, and the switch SW2 may be disposed between the first node of the node capacitor Cm and a common voltage VCM terminal. Here, the switches SW1 and SW2 may be switched at different timings to transfer a driving signal to the node capacitor Cm.

The first integrating circuit unit 320 may include an operational amplifier OPA1, a feedback capacitor CF1, a switch SW3, a switch SW4, and a switch SW5. The switch SW3 may be disposed between a second node of the node capacitor Cm and an inverting terminal of the operational amplifier OPA1, and the switch SW4 may be disposed between the second node of the node capacitor Cm and a common voltage VCM terminal. The switch SW5 may be disposed between the inverting terminal and an output terminal of the operational amplifier OPA1, and the feedback capacitor CF1 may be connected to the switch SW5 in parallel. A non-inverting terminal of the operational amplifier OPA1 may be connected to the common voltage VCM terminal.

Charges stored in the node capacitor Cm may be integrated by the feedback capacitor CF1 and the operational amplifier OPA1 and may then be output as an output voltage Vbout from the output terminal of the operational amplifier OPA1, by switching operations of the switches SW1 to SW5. The output voltage Vbout may be determined according to capacitance of the capacitor Cm and the capacitor CF1. Therefore, the capacitor CF1 may be configured to have a larger amount of capacitance than that of the capacitor Cm in which charges to be measured are charged, thereby preventing the output voltage Vbout of the first integrating circuit unit 310 from being saturated.

The buffer capacitor Cn may have a first node connected to the output terminal of the operational amplifier OPA1 and may be charged or discharged according to a magnitude and a polarity of the output voltage Vbout.

The second integrating circuit unit 330 may include an operational amplifier OPA2, a feedback capacitor CF2, a switch SW6, a switch SW7, and a switch SW8. The switch SW6 may be disposed between a second node of the buffer capacitor Cn and an inverting terminal of the operational amplifier OPA2, and the switch SW7 may be disposed between the second node of the buffer capacitor Cn and a common voltage VCM terminal. The switch SW8 may be disposed between the inverting terminal and a non-inverting output terminal of the operational amplifier OPA2, and the feedback capacitor CF2 may be connected to the switch SW8 in parallel. The non-inverting terminal of the operational amplifier OPA2 may be connected to the common voltage VCM terminal.

Charges stored in the buffer capacitor Cn may be integrated by the feedback capacitor CF2 and the operational amplifier OPA2 and may then be output as a non-inverted output voltage Vp and an inverted output voltage Vn from the output terminal of the operational amplifier OPA2, by switching operations of the switches SW6 and SW7. Here, the non-inverted output voltage Vp and the inverted output voltage Vn may correspond to voltages of which magnitudes are the same while polarities are opposed to each other.

The amplifying unit 340 may include a plurality of resistors R1 and R2 and operational amplifiers OPA3 and OPA4 to differentially amplify the non-inverted output voltage Vp and the inverted output voltage Vn. In this configuration, a voltage Vo1 generated by subtracting the inverted output voltage Vn from the non-inverted output voltage Vp and amplifying a voltage corresponding to a result of the subtraction by a ratio of resistance between the resistors R1 and R2 may be output from an output terminal of the operational amplifier OPA3, a voltage Vo2 generated by subtracting the non-inverted output voltage Vp from the inverted output voltage Vn and amplifying a voltage corresponding to a result of the subtraction by the ratio of resistance between the resistors R1 and R2 may be output from an output terminal of the operational amplifier OPA4. Here, the output voltages Vo1 and Vo2 may be used as analog signals for determining a touch input.

In addition, the amplifying unit 340 may differentially amplify the non-inverted output voltage Vp and the inverted output voltage Vn in a reset section of the second integrating circuit unit 320, that is, a section in which the switch SW8 is turned on, to generate analog signals corresponding to offset values that may be generated in the first and second integrating circuit units 320 and 330.

Figure 4:
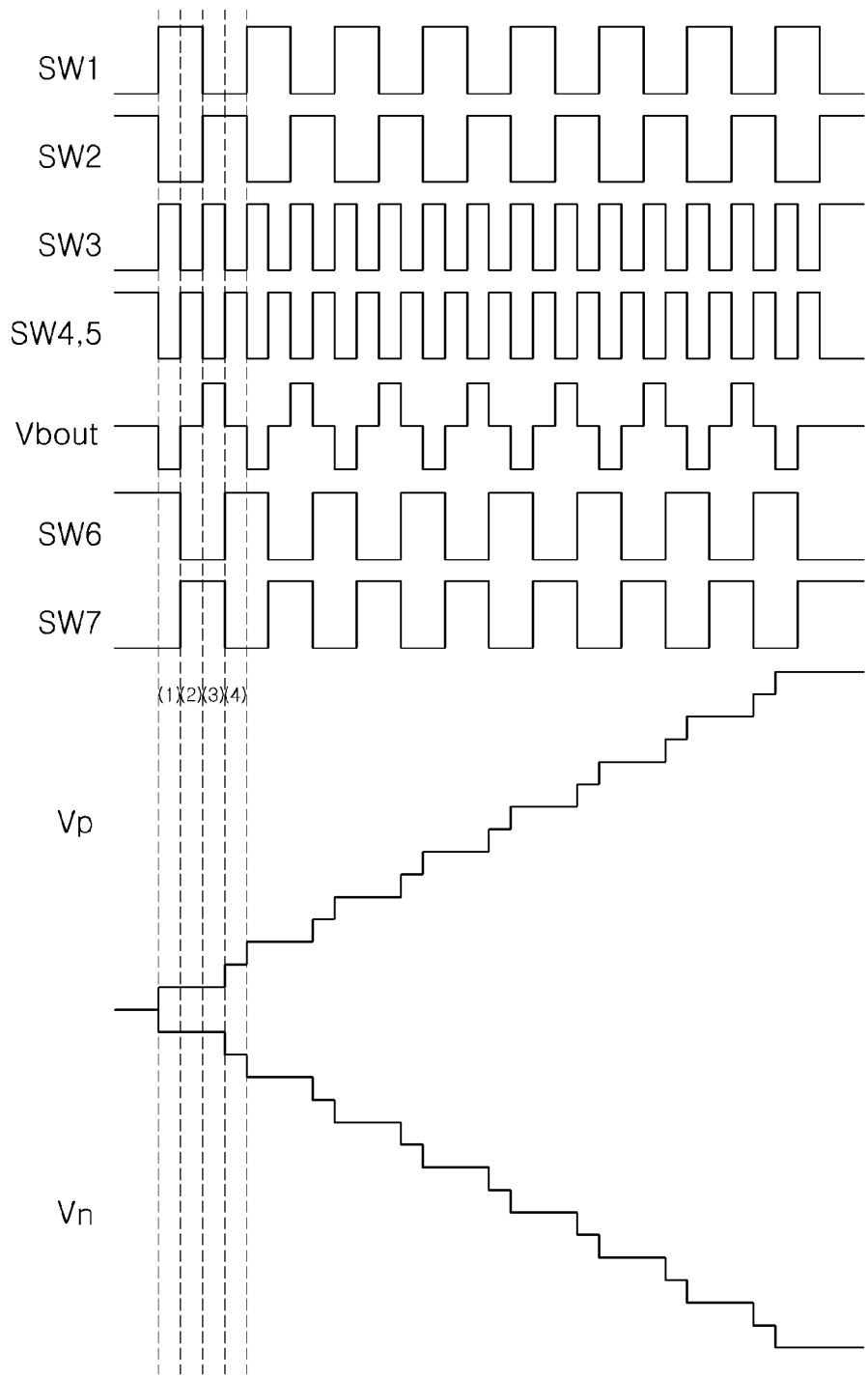
FIG. 4 is a diagram for illustrating an output voltage generated by clock signals applied to switches SW1 to SW7 and switching operations according to the clock signals.

FIG. 4 is a diagram for illustrating an output voltage generated by clock signals applied to switches SW1 to SW7 and switching operations according to the clock signals. In the case in which a clock signal applied to a switch is at a high level, the switch may be turned on, and in the case in which a clock signal is at a low level, the switch may be turned off. With reference to FIG. 4, Vbout may correspond to the output voltage of the operational amplifier OPA1 of the first integrating circuit unit 320, and Vp and Vn may correspond to the output voltages of the operational amplifier OPA2 of the second integrating circuit unit 330. Vn and Vp are voltages of which magnitudes are the same while polarities are opposed to each other. Therefore, hereinafter, Vp will be mainly described, and a detailed description of Vn will be omitted.

Hereinafter, an operation of the capacitance sensing apparatus according to the embodiment of the invention will be described in detail with reference to FIGS. 3 and 4.

In section (1), the switches SW1, SW3, and SW6 are turned on and the switches SW2, SW4, and SW7 are turned off, such that charges charged in the capacitor Cm of the first integrating circuit unit 320 by (VDD−VCM) are non-inverting-integrated and then output. In section (1), an output voltage Vbout1 output from the operational amplifier OPA1 of the first integrating circuit unit 320 may be represented by the following Equation 1. Where a value of a common voltage VCM is VDD/2 and Vnoise1 indicates a magnitude of introduced noise in section (1).

$$Vbout1 = VCM - \frac{Cm}{CF1} * (VDD - VCM - Vnoise1). \quad \text{Equation 1}$$

In this section, charges corresponding to (Vbout1−VCM) are changed in the buffer capacitor Cn, and the charges charged in the buffer capacitor Cn are integrated by the second integrating circuit unit 330 and are then output. An increment ΔVp1 of the non-inverted output voltage Vp1 of the second integrating circuit unit 330 in section (1) may be represented by the following Equation 2.

$$\Delta Vp1 = \frac{Cn}{CF2} * (VCM - Vbout1) \quad \text{Equation 2}$$
$$= \frac{Cm}{CF1} \frac{Cn}{CF2} * (VDD - VCM - Vnoise1)$$

In section (2), the switches SW1, SW4, SW5, and SW7 are turned on, and the switches SW2, SW3, and SW6 are turned off. The switches SW1 and SW4 are turned on, such that charges corresponding to (VDD−VCM) are charged in the node capacitor Cm, and the switch SW5 is turned on, such that the operational amplifier OPA1 is reset to output the common voltage VCM. The switch SW6 is turned off, such that the non-inverted output voltage Vp of the second integrating circuit unit 330 is maintained.

In section (3), the switches SW2, SW3, and SW7 are turned on, and the switches SW1, SW4, SW5, and SW6 are turned off. The switches SW2 and SW3 are turned on, such that the charges that have been charged in the capacitor Cm by (VDD−VCM) are discharged. In this section, an output voltage Vbout2 output from the operational amplifier OPA1 may be represented by the following Equation 3. In Equation 3, Vnoise2 indicates introduced noise in section (3).

$$Vbout2 = VCM + \frac{Cm}{CF1} * (VCM + Vnoise2) \quad \text{Equation 3}$$

Further, in section (3), the switch SW6 is turned off and the switch SW7 is turned on, such that the output voltage Vp of the second integrating circuit unit is maintained, and charges corresponding to (Vbout2−VCM) are charged in the buffer capacitor Cn.

In section (4), the switches SW2, SW4, SW5, and SW6 are turned on, and the switches SW1, SW3, and SW7 are turned off. The switch SW5 is turned on, such that the operational amplifier OPA1 is reset to output the common voltage VCM. In this section, the switch SW6 is turned on and the switch SW7 is turned off, such that the charges charged in the buffer capacitor Cn by (Vbout2−VCM) are discharged. In this case, an increment ΔVp2 of the non-inverted output voltage of the second integrating circuit unit 330 may be represented by the following Equation 4.

$$\Delta Vp2 = \frac{Cn}{CF2} * (Vbout2 - VCM) \quad \text{Equation 4}$$
$$= \frac{Cm}{CF1} \frac{Cn}{CF2} * (VCM + Vnoise2)$$

In sum, an increment ΔVp of the output voltage integrated by the second integrating circuit unit 330 during a single period in which the switches SW1 and SW2 are operated once may be represented by the following Equation 5.

$$\Delta Vp = \Delta Vp1 + \Delta Vp2. \quad \text{Equation 5}$$
$$= \frac{Cm}{CF1} \frac{Cn}{CF2} * (VDD - VCM - Vnoise1) + \frac{Cm}{CF1} \frac{Cn}{CF2} * (VCM + Vnoise2)$$
$$= \frac{Cm}{CF1} \frac{Cn}{CF2} * (VDD + Vnoise1 - Vnoise2).$$

Here, it may be confirmed that in the case in which values of Vnoise1 and Vnoise2 are the same as each other, common noise is removed in a final output of the second integrating circuit unit 330. That is, during a single period in which the driving signal is applied to the capacitor Cm by the switches SW1 and SW2, an effect of performing integration twice in positive and negative directions is generated, whereby the common noise may be efficiently removed.

The amplifying unit 340 may differentially amplify the non-inverted output voltage Vp and the inverted output voltage Vn of the second integrating circuit unit. Here, the output voltages Vo1 and Vo2 output from the amplifying unit 340 may be represented by the following Equation 6. Here, at least one of Vo1 and Vo2 output from the amplifying unit 340 may be used as an analog signal for determining a touch input.

$$Vo1 = \frac{R1}{R2} * (Vp - Vn) \quad \text{Equation 6}$$

$$Vo2 = \frac{R1}{R2} * (Vn - Vp)$$

The amplifying unit 340 may output Vo1 and Vo2 in a reset section of the second integrating circuit unit 330, that is, a section in which the switch SW8 is turned on, as well as an integration section of the second integrating circuit unit 330. In the case in which an offset is not present, since the voltages Vp and Vn are maintained as the same value in the reset section of the second integrating circuit unit 330, the generated voltages Vo1 and Vo2 are required to have a zero level. However, in the case in which a positive offset is present, Vo1 has an output increased by an amplified offset value, and in the case in which a negative offset is present, Vo2 has an output decreased by an amplified offset value. The voltage levels of Vo1 and Vo2 in the reset section of the second integrating circuit unit 330 may be used as analog signals corresponding to offset values of the first and second integrating circuit units 320 and 330.

Figure 5:
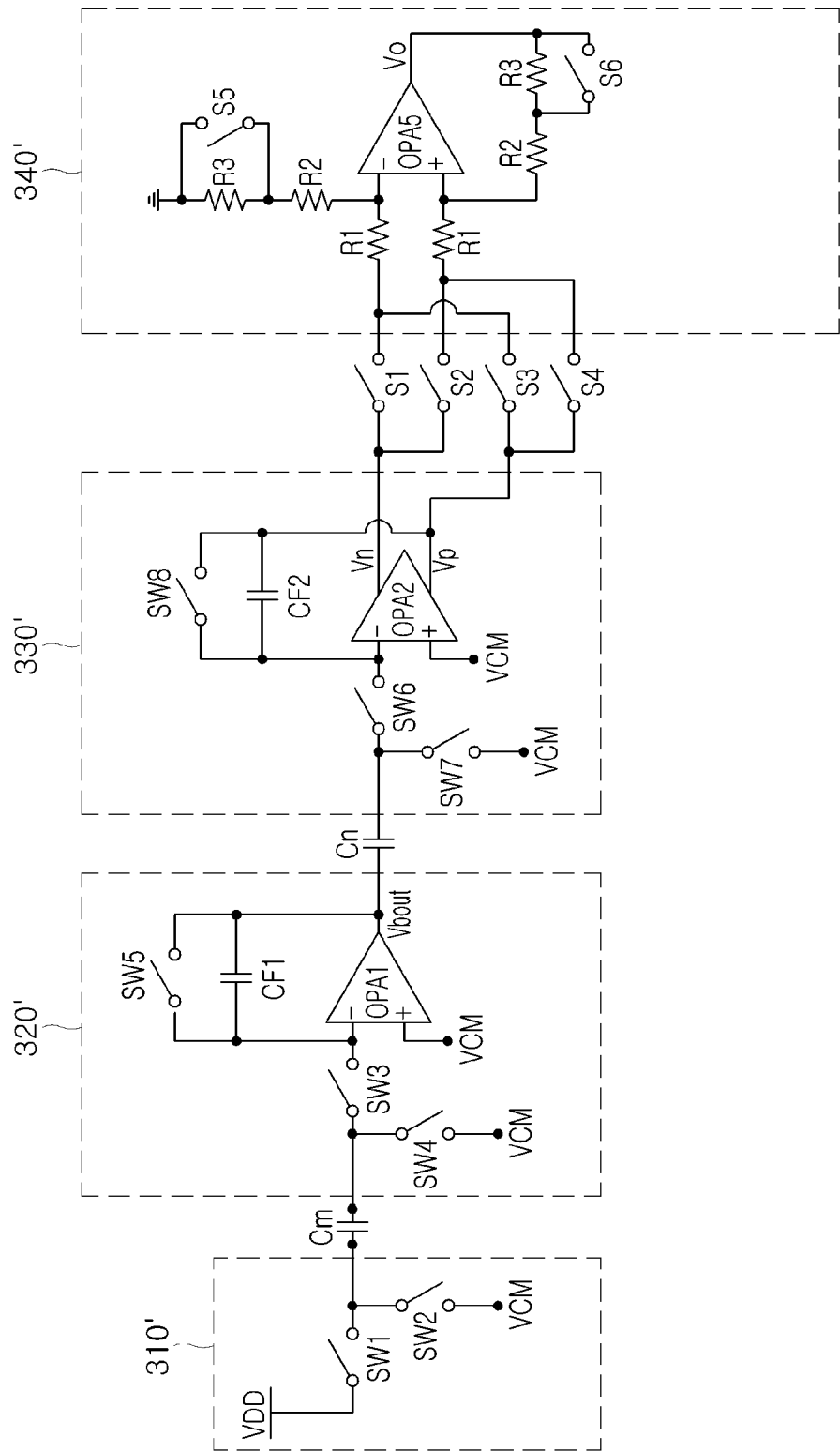
FIG. 5 is a circuit diagram showing a capacitance sensing apparatus according to another embodiment of the present invention.

FIG. 5 is a circuit diagram showing a capacitance sensing apparatus according to another embodiment of the invention. Since a driving circuit unit 310', a first integrating circuit unit 320', and a second integrating circuit unit 330' of FIG. 5 are the same as those of FIG. 3, a detailed description thereof will be omitted, and an amplifying unit 340' will be mainly described.

The amplifying unit 340' may include a plurality of resistors R1, R2, and R3, an operational amplifier OPA5, and switches S1 to S6. In an operational section of the second integrating circuit unit 330', the switches S1, S4, S5, and S6 are turned on and the switches S2 and S3 are turned off, such that an output voltage Vo represented by the following Equation 7 is generated.

$$Vo = \frac{R1}{R2} * (Vp - Vn) \quad \text{Equation 7}$$

In the reset section of the second integrating circuit unit 330', the switches S5 and S6 are turned off in order to accurately determine a small positive offset. Therefore, a differential amplifying rate is increased, whereby the offset may be accurately determined.

In addition, an output voltage Vo is generated in a state in which the switches S1 and S4 are turned on and the switches S2 and S3 are turned off in order to determine a positive offset, and an output voltage Vo is generated in a state in which the switches S2 and S3 are turned on and the switches S1 and S4 are turned off in order to determine a negative offset, whereby an analog signal regarding the offset may be generated. That is, during a single reset section, the switches S1 and S4 and the switches S2 and S3 are turned on and off and turned off and on alternately, whereby the analog signal regarding the offset may be generated.

Figure 6:
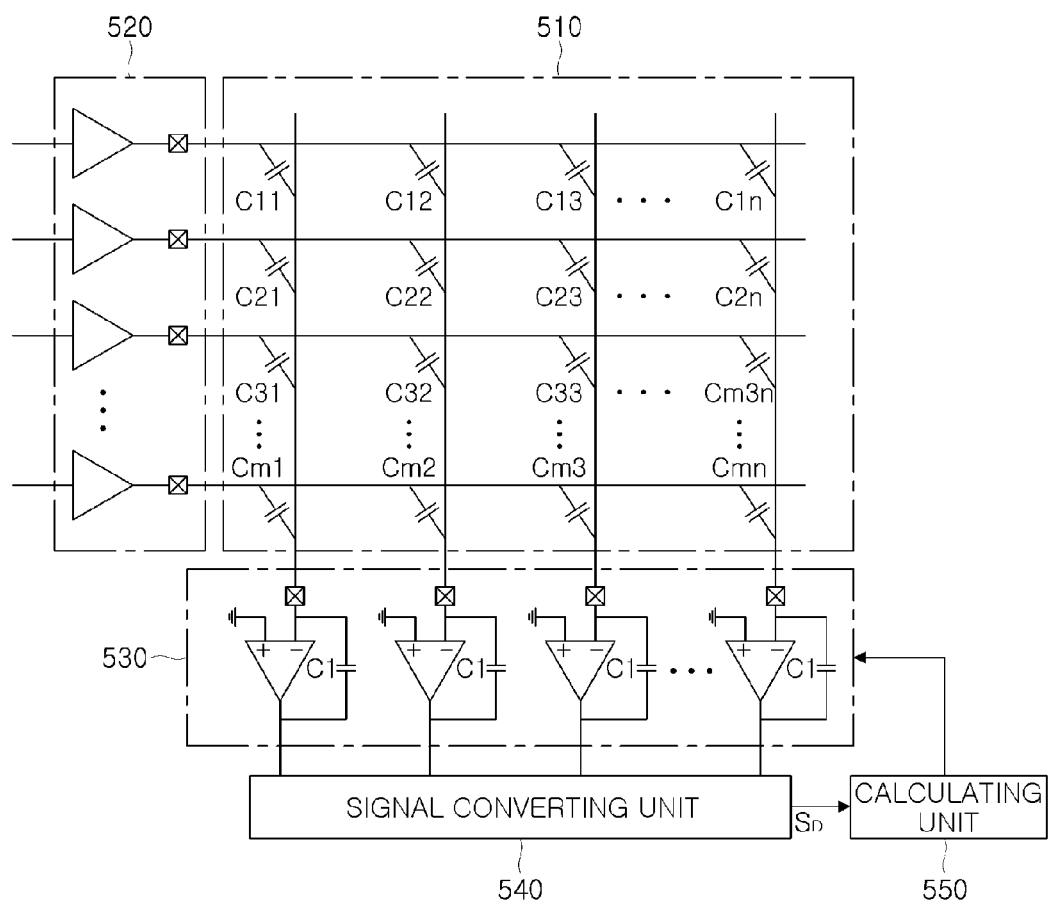
FIG. 6 is a view showing a touchscreen apparatus including the capacitance sensing apparatus according to an embodiment of the present invention.

FIG. 6 is a view showing a touchscreen apparatus including a capacitance sensing apparatus according to an embodiment of the invention.

Referring to FIG. 6, the touchscreen apparatus according to the present embodiment may include a panel unit 510, a driving circuit unit 520, a sensing circuit unit 530, a signal converting unit 540, and a calculating unit 550. The panel unit 510 may include a plurality of first electrodes extended in a first axis direction, that is, a horizontal direction of FIG. 6 and a plurality of second electrodes extended in a second axis direction, that is, a vertical direction of FIG. 6, intersecting with the first axis direction, and changes in capacitance C11 to Cmn are generated in intersection points between the first and second electrodes. The changes in capacitance C11 to Cmn generated in the intersection points between the first and second electrodes may be changes in mutual capacitance generated by a driving signal applied to the first electrodes by the driving circuit unit 520. Meanwhile, the driving circuit unit 520, the sensing circuit unit 530, the signal converting unit 540, and the calculating unit 550 may be implemented as a single integrated circuit (IC).

The driving circuit unit 520 may apply a predetermined driving signal to the first electrodes of the panel unit 510. The driving signal may be a square wave signal, a sine wave signal, a triangle wave signal, or the like, having a predetermined period and amplitude, and may be sequentially applied to the plurality of respective first electrodes. In FIG. 6, circuits for generating and applying the driving signal are individually connected to the plurality of respective first electrodes, but the invention is not limited thereto and it may be configured such that a single driving signal generating circuit may be provided and the driving signal may be applied to the plurality of respective first electrodes using a switching circuit.

The sensing circuit unit 530 may include integrating circuits for sensing the changes in capacitance C11 to Cmn from the second electrodes. The integrating circuit may include at least one operational amplifier and a capacitor C1 having a predetermined capacitance. The operational amplifier has an inverting input terminal connected to the second electrode to convert the changes in capacitance C11 to Cmn into an analog signal such as a voltage signal, or the like, and output the converted signal. In the case in which the driving signal is sequentially applied to the plurality of respective first electrodes, the changes in capacitance may be simultaneously detected from the plurality of second electrodes, so m number of integrating circuits corresponding to the number of the second electrodes may be provided.

The signal converting unit 540 may generate a digital signal $S_D$ from the analog signal generated by the integrating circuit. For example, the signal converting unit 540 may include a time-to-digital converter (TDC) circuit measuring a time taken for the analog signal output in a voltage form by the sensing circuit unit 530 to reach a predetermined reference voltage level and converting the measured time into the digital signal $S_D$ or an analog-to-digital converter (ADC) circuit measuring an amount by which a level of the analog signal output by the sensing circuit unit 530 is changed for a predetermined time and converting the measured amount into the digital signal $S_D$.

The calculating unit 550 may determine a touch input applied to the panel unit 510 using the digital signal $S_D$. As an example, the calculating unit 550 may determine the number, coordinates, gestures, or the like, of touch inputs applied to the panel unit 510. Here, the calculating unit 550 generates offset data from Vo1 and Vo2 output in the reset section of the second integrating circuit 330 of FIG. 3, stores the offset data, and then subtracts the offset data from the digital signal generated in the operational section of the sensing circuit unit 530, whereby the touch input may be determined.

In comparing the capacitance sensing apparatus shown in FIGS. 2, 3 and 5 with the touchscreen apparatus shown in FIG. 6, the node capacitors C11 to Cmn generated in the intersection points between the first and second electrodes of FIG. 6 may correspond to the capacitor Cm of FIGS. 2, 3 and 5. In addition, the driving circuit unit 520 of FIG. 6 may be considered as the driving circuit units 210, 310, and 310' of FIGS. 2, 3, and 5, the sensing circuit unit 530 of FIG. 6 may be considered as a component including the first integrating circuit units 220, 320, and 320', the second integrating circuit units 230, 330, and 330', and the amplifying units 240, 340, and 340' of FIGS. 2, 3, and 5.

As set forth above, according to embodiments of the invention, a change in capacitance generated in a touch panel is integrated twice in positive (+) and negative (−) directions during a single period of a driving signal, whereby common noise may be effectively removed. In addition, integrated non-inverted and inverted output voltages are differentially amplified to accurately set an offset value, whereby a touch input may be accurately determined.

While the present invention has been shown and described in connection with the embodiments, it will be apparent to those skilled in the art that modifications and variations can be made without departing from the spirit and scope of the invention as defined by the appended claims.

What is claimed is:

1. A capacitance sensing apparatus comprising:
a driving circuit device configured to apply a driving signal of a predetermined first period to a node capacitor;
a first integrating circuit device configured to integrate a voltage charged in the node capacitor, to generate an output voltage;
a buffer capacitor configured to be charged or discharged by the output voltage of the first integrating circuit device;
a second integrating circuit device configured to integrate a voltage charged in the buffer capacitor, to generate a non-inverted output voltage, and to generate an inverted output voltage; and
an amplifying device including a plurality of amplifying circuits configured to differentially amplify the non-inverted output voltage and the inverted output voltage generated by the second integrating circuit device,
wherein in a reset section of the second integrating circuit device, the plurality of amplifying circuits are configured to respectively amplify voltages corresponding to a positive offset and a negative offset, to generate offset information for determining touch inputs.

2. The capacitance sensing apparatus of claim 1, wherein the output voltage of the first integrating circuit device has a regular and repeated cycle of being decreased, maintained, increased and again maintained.

3. The capacitance sensing apparatus of claim 2, wherein the non-inverted output voltage of the second integrating circuit device is increased at a point in time at which the output voltage of the first integrating circuit device is decreased.

4. The capacitance sensing apparatus of claim 1, wherein the driving circuit device comprises:
a first switch disposed between a first node of the node capacitor and a driving voltage terminal; and
a second switch disposed between the first node of the node capacitor and a common voltage terminal,
wherein the first and second switches are respectively switched by first and second clocks having the first period, and the first and second clocks have a phase difference of 180 degrees therebetween.

5. The capacitance sensing apparatus of claim 4, wherein the first integrating circuit device comprises:
a third switch having one end connected to a second node of the node capacitor;
a fourth switch disposed between the second node of the node capacitor and the common voltage terminal;
a first operational amplifier having an inverting terminal connected to the other end of the third switch and a non-inverting terminal connected to the common voltage terminal;
a fifth switch disposed between the inverting terminal of the first operational amplifier and an output terminal of the first operational amplifier; and
a first feedback capacitor connected to the fifth switch in parallel,
the third switch being switched by a third clock having a second period, the fourth and fifth switches being switched by a fourth clock having the second period, and the third and fourth clocks having a phase difference of 180 degrees therebetween.

6. The capacitance sensing apparatus of claim 5, wherein the second integrating circuit device comprises:
a sixth switch having one end connected to the buffer capacitor;
a seventh switch disposed between the buffer capacitor and the common voltage terminal;
a second operational amplifier having an inverting terminal connected to the other end of the sixth switch and a non-inverting terminal connected to the common voltage terminal;
an eighth switch disposed between the inverting terminal of the second operational amplifier and a non-inverting output terminal of the second operational amplifier; and
a second feedback capacitor connected to the eighth switch in parallel,
the sixth and seventh switches being switched by fifth and sixth clocks having the first period, respectively, and the fifth and sixth clocks having a phase difference of 180 degrees therebetween.

7. The capacitance sensing apparatus of claim 6, wherein the first period is twice as large as the second period.

8. The capacitance sensing apparatus of claim 6, wherein the first and fifth clocks have a phase difference of 90 degrees therebetween.

9. The capacitance sensing apparatus of claim 5, wherein the first period is twice as large as the second period.

10. The capacitance sensing apparatus of claim 1, wherein the plurality of amplifying circuits of the amplifying device comprise:
a first amplifier configured to amplify, by a first amplification factor, a difference between the non-inverted output voltage and the inverted output voltage;
a second amplifier configured to amplify, by a second amplification factor, the difference between the non-inverted output voltage and the inverted output voltage, and
wherein an output of the first amplifier is increased by an amplified positive offset value, and an output of the second amplifier decreased by an amplified negative offset value.

11. A touchscreen apparatus comprising:
a panel device including a plurality of driving electrodes and a plurality of sensing electrodes;
a driving circuit device configured to apply a driving signal having a predetermined first period, to the plurality of respective driving electrodes;
a sensing circuit device configured to sense changes in capacitance generated in intersection points between the plurality of driving electrodes and the plurality of sensing electrodes, to generate first and second integrated voltages, and configured to differentially amplify the first and second integrated voltages by a plurality of amplifying circuits, to generate an analog signal;

a signal converting device configured to convert the analog signal into a digital signal; and a calculating device configured to determine a touch input based on the digital signal, wherein the calculating device is configured to generate offset data according to the digital signal generated in a reset section of the sensing circuit device, wherein in the reset section of the sensing circuit device, the plurality of amplifying circuits are configured to respectively amplify voltages corresponding to a positive offset and a negative offset.

12. The touchscreen apparatus of claim 11, wherein the first and second integrated voltages have the same magnitude and different polarities.

13. The touchscreen apparatus of claim 11, wherein the calculating device subtracts the offset data from the digital signal generated in an operational section of the sensing circuit device, to generate valid data.

14. The touchscreen apparatus of claim 13, wherein the calculating device is configured to determine at least one of coordinates, the number, and gestures of touch inputs based on the valid data.

15. The touchscreen apparatus of claim 11, wherein the sensing circuit device is configured to the changes in capacitance, to generate a buffer voltage having a regular and repeated cycle of being decreased, maintained, increased, and again maintained, and integrates the buffer voltage, to generate the first and second integrated voltages.

* * * * *